United States Patent
Reignoux et al.

(10) Patent No.: US 7,028,910 B2
(45) Date of Patent: Apr. 18, 2006

(54) PORTABLE OBJECT WITH CHIP AND ANTENNA

(75) Inventors: Yves Reignoux, Clery Saint André (FR); Joseph Leibenguth, Saint-Cloud (FR); Stephane Provost, Sandillon (FR); Jocelyne Chesneau, Donnery (FR); Fabrizio Serra, Besancon (FR)

(73) Assignee: Schlumberger, Systemes, Montrouge (FR)

( * ) Notice: Subject to any disclaimer, the term of this patent is extended or adjusted under 35 U.S.C. 154(b) by 0 days.

(21) Appl. No.: 10/470,909

(22) PCT Filed: Feb. 1, 2002

(86) PCT No.: PCT/IB02/00307

§ 371 (c)(1), (2), (4) Date: Feb. 25, 2004

(87) PCT Pub. No.: WO02/061676

PCT Pub. Date: Aug. 8, 2002

(65) Prior Publication Data

US 2004/0129786 A1 Jul. 8, 2004

(30) Foreign Application Priority Data

Feb. 2, 2001 (FR) .................................. 01 01404

(51) Int. Cl.
  G06K 19/06 (2006.01)
  G06K 5/00 (2006.01)
(52) U.S. Cl. .................. 235/492; 235/380; 235/493
(58) Field of Classification Search .............. 235/492, 235/488, 491, 486, 380, 493; 343/742, 867
See application file for complete search history.

(56) References Cited

U.S. PATENT DOCUMENTS

| | | | |
|---|---|---|---|
| 5,907,477 A * | 5/1999 | Tuttle et al. ................. 235/491 |
| 6,021,949 A | 2/2000 | Boiron |
| 6,088,230 A | 7/2000 | Finn et al. |
| 6,404,317 B1 * | 6/2002 | Mizoguchi et al. ......... 336/200 |
| 6,568,600 B1 * | 5/2003 | Carpier et al. .............. 235/492 |
| 6,581,747 B1 * | 6/2003 | Charlier et al. ............. 235/380 |
| 6,794,727 B1 * | 9/2004 | Leduc et al. ................ 257/679 |
| 2001/0002826 A1 * | 6/2001 | Tuttle et al. ................ 343/872 |

FOREIGN PATENT DOCUMENTS

| | | | |
|---|---|---|---|
| EP | 0841634 | | 5/1998 |
| JP | 09240179 A | * | 9/1997 |
| JP | 409240179 A | | 9/1997 |

* cited by examiner

Primary Examiner—Thien M. Le
Assistant Examiner—Thien Mai
(74) Attorney, Agent, or Firm—Cohen, Pontani, Lieberman & Pavane

(57) ABSTRACT

The invention concerns a method of manufacturing a module intended to create a portable object with chip and antenna. The portable object comprises an antenna and a chip placed on an insulating substrate. The antenna comprises a plurality of turns. The method comprises a first step in which an insulating substrate with at least one side is provided. The method is characterised in that it further comprises a second step in which an individual housing opening in the said side is made for each of the said turns and a third step in which said antenna comprising a plurality of turns is made by placing a conducting material in each individual housing.

10 Claims, 2 Drawing Sheets

PORTABLE OBJECT WITH CHIP AND ANTENNA

FIELD OF THE INVENTION

This invention concerns a method of manufacturing a module intended to create a portable object with chip and antenna including an antenna and a chip placed on an insulating substrate, a method of manufacturing a batch of n modules for portable objects with chip and antenna, a method of creating a portable object with chip and antenna, and a module intended to create a portable object with chip and antenna, and a portable object with chip and antenna.

Such portable objects may, in particular, be cards or phone cards, but also security labels or tags.

Such cards with chip and antenna are intended to load or download information by radio transmission of data between an antenna placed in the card body and a fixed transmitter/receiver located nearby. Such labels are, for example, intended to be affixed to products on sale to prevent theft.

BACKGROUND OF THE INVENTION

Methods of manufacturing such portable objects, especially cards, are known, for example in document U.S. Pat. No. 6,088,230, in which the antenna, consisting of a conducting wire, is first connected by one end to a contact on a chip placed on a substrate, then placed on the substrate with a wire guide and insertion means which are moved bi-axially across the surface of the substrate (along X and Y axes). When the antenna follows a meandering path, connection points are necessary at each change of direction.

To make these connection points, the insertion means must be lowered along a Z-axis and the conducting wire is temporarily pressed against the surface of the substrate and then pressed and thermally welded in the substrate. Lastly, the second end is connected to another contact of the chip, and the substrate and its components can then be covered by a protective layer.

The steps involved in producing a card with chip and antenna are difficult, especially when the antenna is not straight.

In addition, the antenna is not held in place before being covered with the protective layer, making it impossible to guarantee its position.

The European patent application published under number EP 0 841 634 concerns a method of manufacturing an integrated circuit card comprising an antenna comprising at least one turn in which a unique housing is made to contain said antenna.

The U.S. Patent published under U.S. Pat. No. 6,021,949 concerns a gaming token comprising an electronic identification element and an antenna. The antenna may comprise a plurality of turns which are placed in a unique housing.

By placing an antenna comprising a plurality of turns in a unique housing there is some disadvantages. During, for example, an injection step following a positioning step in which the antenna is placed in the unique housing, the position of the turns can namely vary, thus modifying the geometry of the antenna. By modifying the geometry of the antenna, there is a risk that the operating frequency of the portable object can be less precisely defined. So the portable object obtained by such a method can be less reliable.

SUMMARY OF THE INVENTION

One purpose of the invention is to propose a method which enable to obtain a more reliable portable object.

According to an aspect of the invention, a method of manufacturing a module intended to create a portable object with chip and antenna. The portable object comprises an antenna and a chip placed on an insulating substrate. The antenna comprises a plurality of turns. The method comprises a first step in which an insulating substrate with at least one side is provided. The method is characterised in that it further comprises:

a second step in which an individual housing opening in the said side is made for each of the said turns;
  a third step in which said antenna comprising a plurality of turns is made by placing a conducting material in each individual housing.

By first making a plurality of individual housings and then by placing each turn of the antenna in a different individual housing, the insulation between the different turns is better. Furthermore the geometry of the antenna is more precisely defined. In particular there is a little risk that the different turns moves during the manufacturing process. The cross-section of the turns, their geometric shape, the distance between them is for example more precisely defined. By thus defining more precisely the geometry of the antenna, the wavelength and operating frequency of the portable object can be more precisely defined in a specific range. This range corresponds thus better to that of the fixed ad hoc transmitters/receivers. So the method according to the invention enables to obtain portable object which are more reliable.

Advantageously, the individual housing can be produced by machining or by laser.

Advantageously, the substrate includes a thermoplastic and the said housing can then be made by hot pressing or moulding.

These modes of realisation of the housing are easy to implement and provide in particular an easy way of making any shape of housing, which means in addition that numerous possibilities are available concerning the type of antenna.

In particular the type of material employed for the antenna contribute to define a precise wavelength and operating frequency in the same range as that of the fixed ad hoc transmitters/receivers. Generally the antenna consists of a conducting material, which in this case can be made from a conducting wire or a conducting paste, depending on the chosen housing.

The turns forming the antenna may have a circular cross-section when a conducting wire is used, for example, and may be wound in various geometries.

Advantageously, the said antenna and the said connections are realised simultaneously.

The connections between the antenna and the chip can be made by direct contacts, each end of the antenna then being physically connected according to known techniques to a respective connector on the chip. The connections can also be made without contact, in this case the chip includes an inductor and the antenna includes an induction coil which interacts with the chip inductor.

An other object of this invention is to propose a method of manufacturing a batch of n modules for portable objects with chip and antenna each comprising an antenna comprising a plurality of turns and a chip placed on an insulating substrate.

This objective is reached due to the fact that a plate is provided on which n areas are defined each including an insulating substrate each of which comprises at least one side, that a plurality of individual housing opening in each of the said sides is made, said individual housings intended to contain separately each turn of an antenna and, that an antenna comprising a plurality of turns is made by placing a conducting material in each of the said individual housings.

This method can be used to produce the modules in medium or even long series production runs. All the housings can, for example, be produced in one step, then all the antennas are made, etc. In particular, this enables the various steps of the method to be carried out on different stations.

An other object of this invention is to improve a method of creating a portable object with chip and antenna.

This objective is achieved due to the fact that said portable object with chip and antenna is made from a module comprising a chip, an antenna comprising a plurality of turns, a substrate in which a plurality of individual housings is made to individually contain the turns.

When the substrate includes advantageously a thermoplastic, at least one layer of thermoplastic can be placed on the said module and the assembly formed by the said module and the said layer of thermoplastic can be hot rolled or the said substrate can be placed in a mould and a thermoplastic material can be injected in the said mould.

These two techniques can be used to produce by polymerisation strong bonds between the thermoplastic substrate and the thermoplastic material added to create the portable object with chip and antenna. Thus, after treatment, the substrate is completely buried in the body of the portable object and its physical shape is no longer visible. The rolling or moulding temperatures are low enough to avoid damage to the module, in particular to the electronic components it includes.

Advantageously, an additional form forming a cover can also be placed over the individual housings of the said module to create the portable object with chip and antenna.

This method is especially useful when using a batch of n modules as mentioned above and a single additional form is placed over the entire plate to close each housing.

With the present invention it is still possible to propose a method for creating simultaneously n portable objects with chip and antenna each including an antenna and a chip. This is possible due to the fact that the said portable object with chip and antenna is made from the batch of n modules obtained according to the above-mentioned method.

Advantageously, the n portable objects with chip and antenna can be produced using methods similar to those described previously. In particular, they can be obtained by moulding or hot rolling, when the plate includes advantageously a thermoplastic or with a cover. The assembly so formed, including the plate and the modules, is then cut into n portable objects with chip and antenna.

An other object of this invention is to improve a module intended to create a portable object with chip and antenna comprising an antenna and a chip placed on an insulating substrate, said antenna comprising a plurality of turns.

This object is reached due to the fact that the module comprises an insulating substrate comprising at least one side, a plurality of individual housings opening in said side, that each individual housing comprises a turn of said antenna, said turn being made of a conducting material.

These modules form the main part of the body of a portable object with chip and antenna in which they are fitted simply, for example, according to one of the previously described methods.

These modules can be obtained according to any of the above-mentioned methods. In particular, they can be made individually or in a plate cut afterwards.

An other object of this invention is to improve a portable object with chip and antenna comprising a chip and an antenna.

This object is reached due to the fact that the portable object with chip and antenna comprises a module obtained according to any of the previously described methods.

The invention will be clearly understood and its advantages will appear on reading the detailed description below, of modes of realisation represented as non-limiting examples.

BRIEF DESCRIPTION OF THE DRAWINGS

The description refers to the attached drawings, on which.

DETAILED DESCRIPTION

Figure 1:
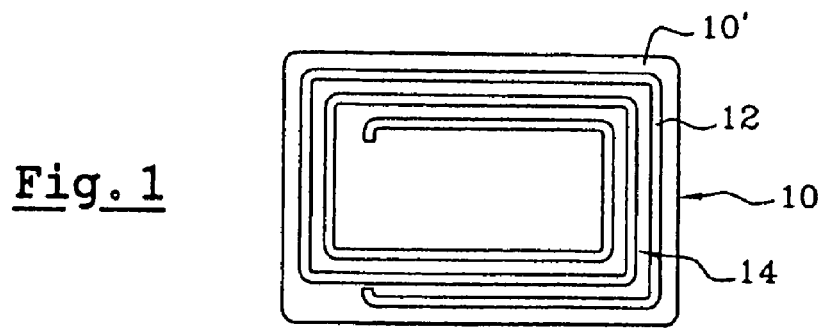
FIG. 1 is a plan view of a substrate.

FIG. 1 shows a substrate 10, preferably of thermoplastic in which, on one of the sides 10', individual open housings 12 has been produced intended to contain an antenna made from conducting material not represented. These housings 12 can be obtained, for example, by machining, laser or moulding. The substrate 10 may also include a housing intended to contain a chip.

Figure 2:
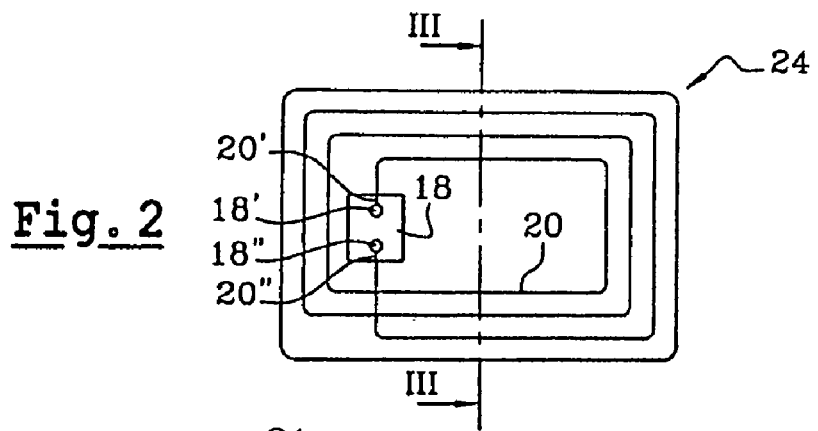
FIG. 2 is a plan view of a module including a substrate, an antenna and chip.

FIG. 2 illustrates a module 24 including the substrate 10 on which a chip 18 has been placed and an antenna 20 which has been placed in the individual open housings 12.

The connections between the antenna 20 and the chip 18 may occur by induction when the antenna 20 includes a coil and the chip 18 includes an inductor or by direct contacts. FIG. 2 shows the antenna 20 which includes a first end 20' connected to a first contact 18' on the chip 18 and a second end 20" connected to a second contact 18". Since the mode of realisation of these connections 18', 20', 18", 20" by direct contacts is known, it is not described in this invention. Advantageously, means 22 are used to hold the antenna 20 in the housing 12. These means 22 may be adhesive material or a special coating which is applied in the individual housings to make sure that the antenna 20 fitted afterwards is held firmly.

Figure 3A:
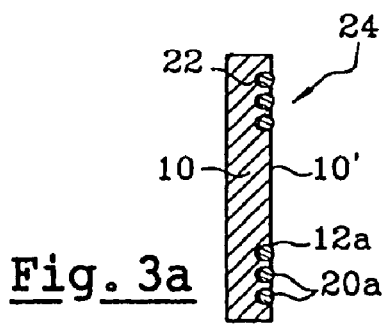
FIGS. 3A and 3B, are cross-sections according to line III—III of FIG. 2 each illustrating a variant of the module.

The antenna 20 may be obtained in several ways. In particular, it may be formed from a conducting wire 20a, as shown on FIG. 3A. The individual housings 12 thus avoid any short circuiting by contact between the various turns 14 of the antenna 20a. The geometry of the antenna is also more precisely defined. In particular the distance between the different turns is more precisely defined. The cross-section of the individual housings 12a is preferably semi-circular.

Figure 3B:
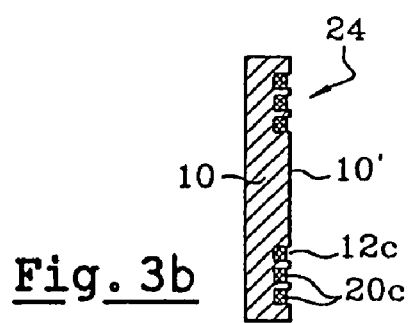
Figure 4:
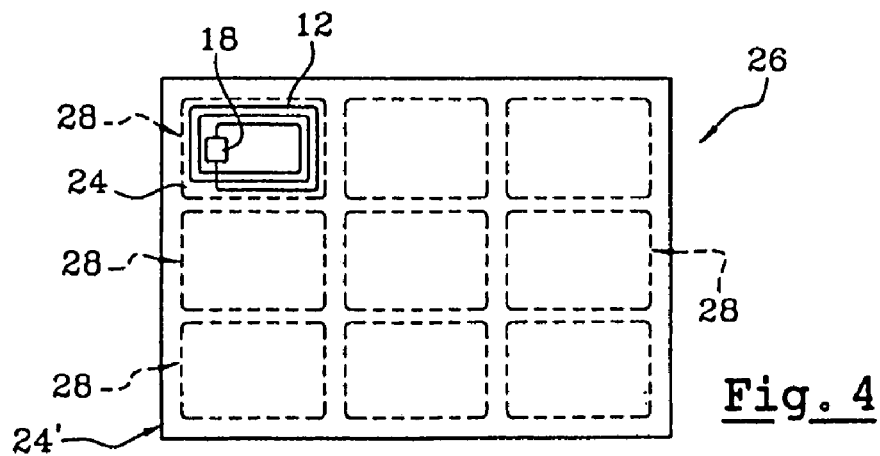
FIG. 4 is a plan view of a plate including several modules.

The antenna 20 can also be made with a filling conducting resin 20c. FIG. 3B shows an example of an individual housing 12c in which a filling conducting resin 20c has been applied. After polymerisation, the conducting resin 20c forms a solid conducting material similar to the conducting wire 20a.

When the substrate 10 includes a chip 18 and an antenna 20 fitted in individual housings 12, it will be referred to as a module 24. This module 24 is then ready to be used to create a portable object, especially a card with chip and antenna. Preferably, apart from its thickness, the dimensions of the module 24 are similar to those of the card with chip and antenna for which it is intended (54×85 mm2 for a standard card).

When the module 24 is used to form another type of card, for example SIMM, care must be taken to place the antenna 20 and the chip 18 in the detachable area of the card support (approximately 15×25 mm2 for the standard SIMM cards) which is placed in the device for which it is intended (mobile telephone for example).

Generally in fact, the module 24 is placed in the useful area of the portable object which can be detached from a larger support intended, for example, to simplify its packaging and protect it before use. For the remainder of the description, we will concentrate on the special case of cards with chip and antenna.

The module 24 can be obtained in two different ways.

Firstly, the modules 24 can be produced individually, by placing a chip 18 on a substrate 10 in which individual housings 12 has been made (by machining, laser, moulding, hot pressing, etc.) and in which an antenna 20 of the above-mentioned type is placed.

Secondly, a batch 24' of n modules 24 can be produced simultaneously on a plate 26 on which areas 28 are defined. In each of these areas 28, individual open housings 12 are made according to any of the above-mentioned techniques, in which an antenna 20 comprising a plurality of turns and a chip 18 are placed. Each module 24 obtained can then be cut out giving the same shape as that obtained using the individual method or the plate 26 including the n modules 24 can be implemented in its entirety in the form of a batch of n cards with chip and antenna before being cut to the particular format of the card.

Several methods are available to integrate the module 24 In the body of a smartcard. These methods are the same when using a plate 26 including n modules 24, to produce simultaneously a batch of n cards with chip and antenna.

Figure 5:
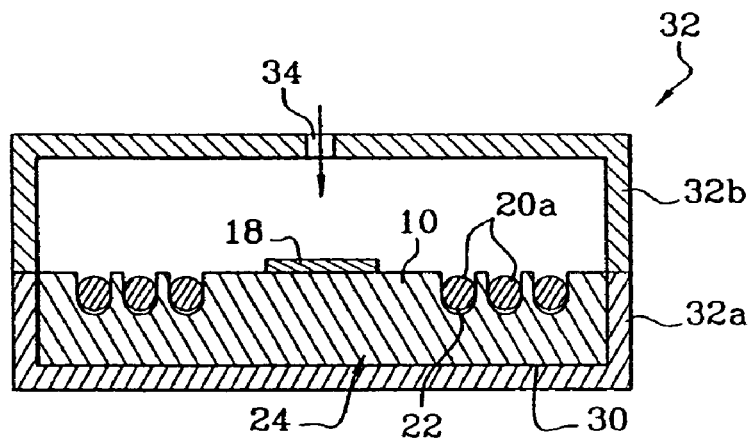
FIG. 5 is a cross-section of the module of FIG. 3A placed in a mould.
Figure 6:
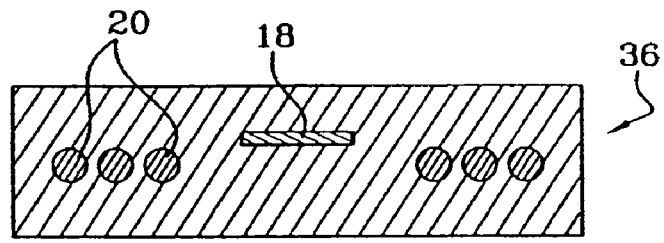
FIG. 6 is a cross-section of a portable object, in particular a card with chip and antenna.

When the module 24 used is a thermoplastic, to produce a card with chip and antenna, the module 24 can be placed in the bottom 30 of a mould 32 preferably made from two parts 32a and 32b, the part 32a supporting for example the module 24, as shown on FIG. 5. Thermoplastic material can then be injected through an opening 34 provided for this purpose in the part 32b. The thermoplastic forming the substrate 10 will react with the thermoplastic material added to form strong bonds by polymerisation. After demoulding, a card with chip and antenna 36 is obtained, as shown on FIG. 6, in which the substrate 10 is no longer visible, since it is completely fused with the added thermoplastic material. The chip 18 and the antenna 20 are completely buried in the body of the smartcard 36.

Figure 7:
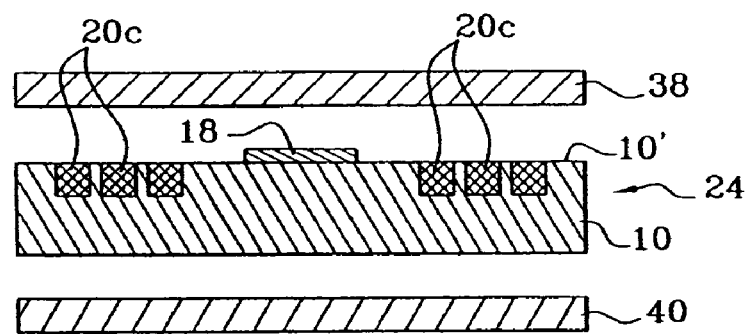
FIG. 7 is a cross-section of the module of FIG. 3B ready for hot rolling.

When the module used is a thermoplastic, the card with chip and antenna 36 can also be produced by hot rolling. In this case, as shown on FIG. 7, a thermoplastic sheet 38 is placed over the side 10' of the substrate 10 including the antenna 20 and the chip 18 and the assembly is hot rolled between known rollers, not shown, so as to form the card with chip and antenna 36 in which the substrate 10 is no longer visible. Preferably, two thermoplastic sheets 38 and 40 are used between which the module 24 is placed.

Figure 8:
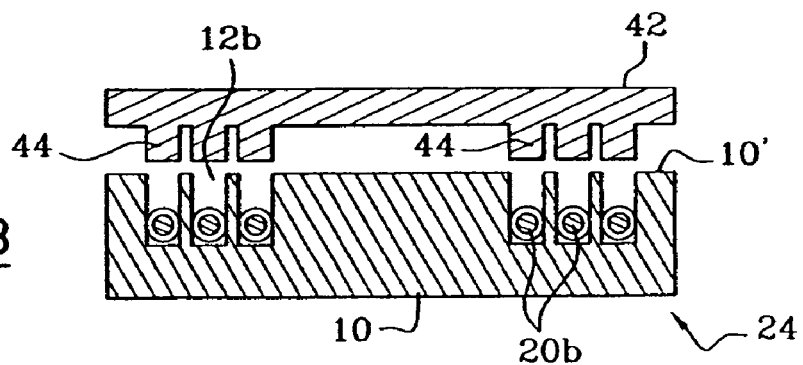
FIG. 8 is a cross-section of the module on which a cover is placed.

FIG. 8 shows another method of producing cards with chip and antenna. The individual housings are closed by placing on the side 10' of the substrate 10, wholly or partially, an additional form 42 which has raised sections 44 formed on one of these sides intended to enter the individual housings 12b. The additional form 42 constitutes a cover 42 which is held on the side 10' by adhesive, thermal, mechanical means, etc., not described, so as to form a card with chip and antenna.

The methods employed to manufacture a card with chip and antenna 36 using the above-mentioned methods also apply to the manufacture of batches of n cards with chip and antenna 36. In fact, the substrate 10 is replaced by the plate 26 including n modules 24 and the same steps as those described, specific to each method, are applied. Thus, an assembly is obtained from the plate 26 including a batch of cards with chip and antenna, which is simply cut out to obtain n cards with chip and antenna 36.

As for the substrate 10, when proceeding by moulding or hot rolling, the plate 26 is no longer visible in the assembly of cards with chip and antenna, since it is completely buried in the thermoplastic material added. Although both of these methods can be used with a plate 26 including several modules 24, it is preferable to first cut out n modules 24 and to produce and realise n cards with chip and antenna 36 individually. The method with cover 42 is as easy to implement, whether for a module 24 or a plate 26 including the batch 24' of n modules 24.

What is claimed is:

1. A method of manufacturing a module (24) intended to create a portable object with chip and antenna (36) comprising an antenna (20, 20a, 20b, 20c) and a chip (18) placed on an insulating substrate (10), said antenna (20, 20a, 20b, 20c) comprising a plurality of turns (14), said method comprising a first step in which an insulating substrate (10) with at least one side (10') is provided, the method is characterised in that it further comprises:
   a second step in which an individual housing (12, 12a, 12b, 12c) opening in the said side (10') is made for each of the said turns (14);
   a third step in which said antenna (20, 20a, 20b, 20c) comprising a plurality of turns (14) is made by placing a conducting material (20a, 20b, 20c) in each individual housing (12, 12a, 12b, 12c).

2. The method according to claim 1, characterised in that a filling conducting resin (20c) is applied in the individual housings (12a, 12c) and in that the said conducting resin (20c) is polymerised to form the antenna (20c).

3. The method according to claim 1, characterised in that a conducting wire (20b) is placed in each individual housing (12, 12a, 12b, 12c) to form the antenna (20b).

4. A method of manufacturing a batch of n modules for portable objects with chip and antenna (36) each comprising:
   an antenna (20, 20a, 20b, 20c) comprising a plurality of turns (14); and
   a chip (18)
placed on an insulating substrate (10), characterised in that a plate (26) is provided on which n areas (28) are defined each including an insulating substrate (10) each of which comprises at least one side (10'), in that a plurality of individual housing (12, 12*a*, 12*b*, 12*c*) opening in each of the said sides (10') is made, said individual housings (12, 12*a*, 12*b*, 12*c*) being intended to contain separately each turn (14) of an antenna (20, 20*a*, 20*b*, 20*c*); and in that an antenna (20, 20*a*, 20*b*, 20*c*) comprising a plurality of turns (14) is made by placing a conducting material (20*a*, 20*b*, 20*c*) in each of the said individual housings (12, 12*a*, 12*b*, 12*c*).

5. A method of creating a portable object with chip and antenna (36) characterised in that said portable object with chip and antenna (36) is made from a module (24) comprising a chip (18), an antenna comprising a plurality of turns (14), a substrate (10) in which a plurality of individual housings (12, 12*a*, 12*b*, 12*c*) is made to individually contain the turns (14).

6. The method according to claim 5 characterised in that the substrate comprises a thermoplastic, in that at least one layer (38,40) of thermoplastic is placed on said module (24) and in that the assembly formed by said module (24) and said layer (38, 40) of thermoplastic is hot rolled.

7. The method according to claim 5, characterised in that an additional form (42) forming a cover is placed over the individual housings (12, 12*a*, 12*b*, 12*c*) of the said module (24).

8. The method according to claim 5, characterised in that said substrate (10) comprises a thermoplastic, in that said substrate (10) is placed in a mould (32) and in that a thermoplastic material is injected in said mould (32).

9. A module (24) intended to create a portable object with chip and antenna (36) comprising an antenna (20, 20*a*, 20*b*, 20*c*) and a chip (18) placed on an insulating substrate (10), said antenna comprising a plurality of turns (14), the module (24) is characterised in that it comprises:

an insulating substrate (10) comprising at least one side (10');

a plurality of individual housings (12, 12*a*, 12*b*, 12*c*) opening in said side (10'); and in that each individual housing (12, 12*a*, 12*b*, 12*c*) comprises a turn (14) of said antenna (20, 20*a*, 20*b*, 20*c*), said turn (14) being made of a conducting material (20*a*, 20*b*, 20*c*).

10. Portable object with chip and antenna (36) comprising a chip (18) and an antenna (20, 20*a*, 20*b*, 20*c*), the portable object is characterised in that it comprises a module (24) obtained according to claim 8.

* * * * *